UNITED STATES PATENT OFFICE.

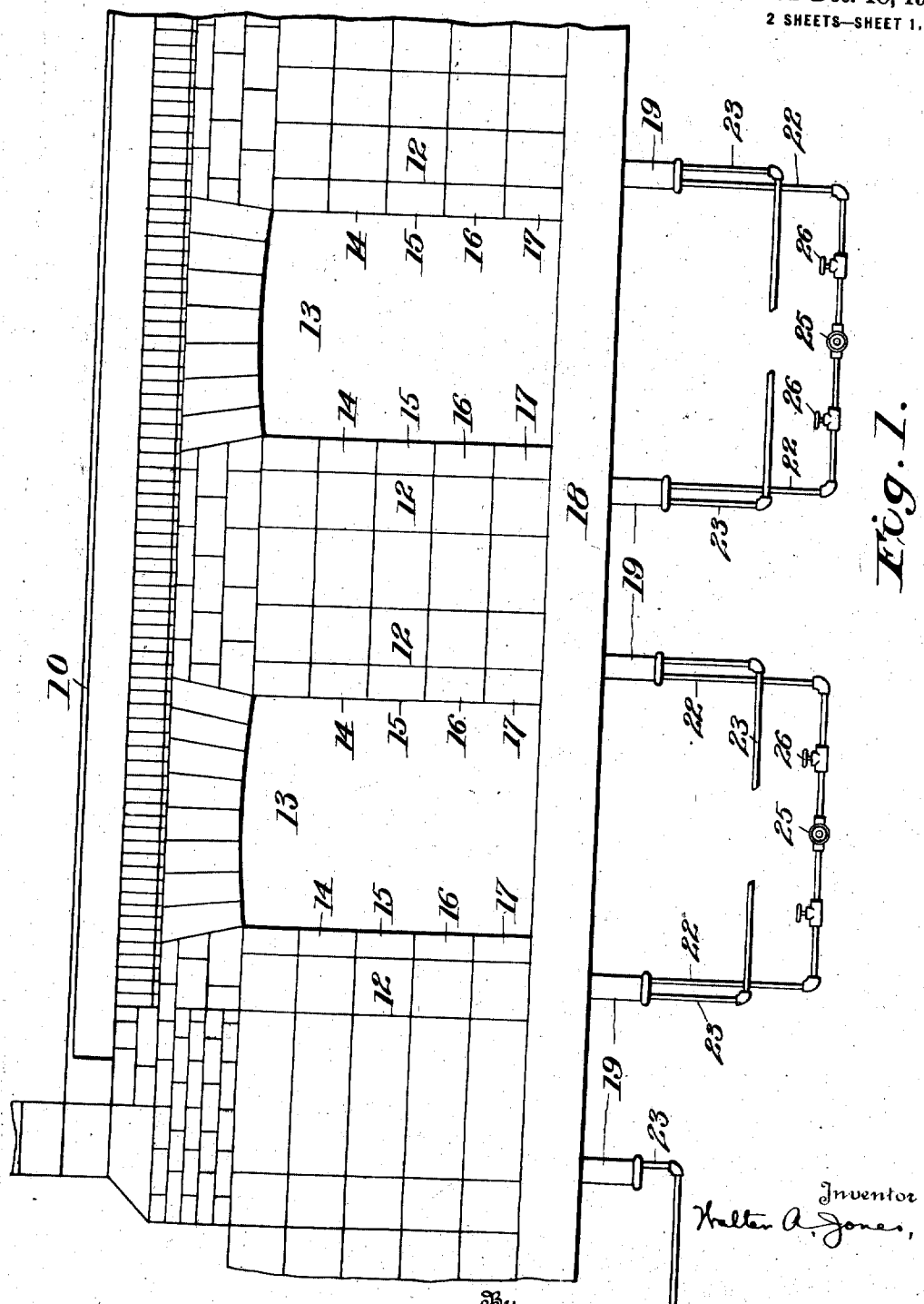

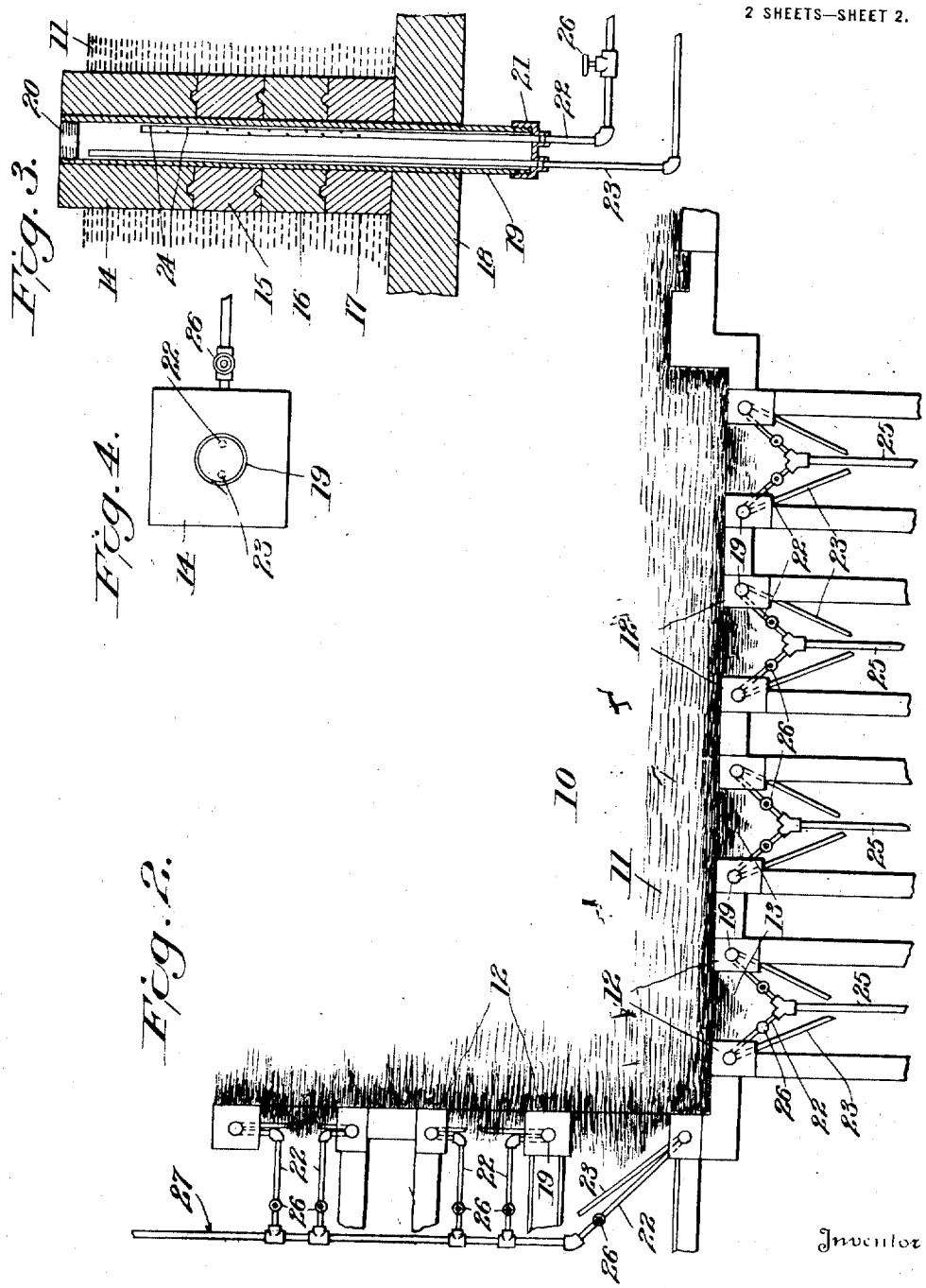

WALTER A. JONES, OF MORGANTOWN, WEST VIRGINIA.

GLASS-TANK.

1,250,893.   Specification of Letters Patent.   Patented Dec. 18, 1917.

Application filed April 10, 1916. Serial No. 90,201.

*To all whom it may concern:*

Be it known that I, WALTER A. JONES, a citizen of the United States, residing at Morgantown, in the county of Monongalia and State of West Virginia, have invented new and useful Improvements in Glass-Tanks, of which the following is a specification.

This invention is an improved method and means for protecting the clay blocks or piers of a glass kiln from disintegration under the intense heat of the molten glass.

The blocks or piers which are employed to separate a series of drawing chambers of a glass tank, are usually constructed of very high grade clay, but experience has shown that they will melt off, and are disintegrated and destroyed by the intense heat and attrition of the molten glass. This destruction is a constant source of expense, both, because of the necessity of frequently replacing the parts, and because the tank must be out of use while the repairs are being made. This melting off of the piers is also objectionable because it affects the quality of the glass by reason of the impurities deposited in the bath and the inequalities in the temperature caused thereby. One of the objects of the present invention is to overcome the foregoing objections by making provision for the protection of the piers, and other similar parts, which are wholly or partially surrounded by molten glass, and to prolong the life thereof. A further object is to provide means for maintaining the exposed portions at a sufficiently low temperature to overcome the melting action of the molten glass. A further object is to provide means for assisting in the maintaining of a uniform temperature of the molten glass.

The invention will be hereinafter fully set forth and particularly pointed out in the claims.

In the accompanying drawings:—

Figure 1 is a side elevation of a glass tank, with the invention applied thereto. Fig. 2 is a plan view thereof. Fig. 3 is a detail sectional view illustrating one of the water containers in position. Fig. 4 is a top view thereof.

Referring to the drawing, 10 designates a glass tank of the type employed where glass cylinders are drawn vertically from chambers into which the glass flows direct from the tank, the molten glass being indicated at 11. The said tank is provided with a plurality of piers 12, spaced apart so as to provide open spaces 13 through which the molten glass flows to the drawing chambers, not shown. Each pier is preferably built up of tongued and grooved clay blocks 14, 15, 16, and 17, almost entirely surrounded by molten glass at temperatures ranging from 1900° to 2250° Fahrenheit. The piers are built upon a bottom 18, as shown.

The respective piers are protected by water containers arranged to maintain the piers at a temperature sufficiently low to overcome or counteract the destroying effect of the intense heat of the molten glass. Each container is made of any suitable material, and of any required shape, and comprises a metallic casing 19, located in a suitable bore formed in the bottom 18, and the blocks of the piers 12. The said container extends to the top of the pier and its upper end is closed by a cap 20, preferably by a screw thread connection. The lower end of the container extends well below the bottom 18 and is closed by a cap 21, perforated to receive a water inlet pipe 22 and a water outlet or overflow pipe 23, the inlet pipe being provided with perforations 24. It will be noted that the inlet end of the outlet pipe is located close to the upper end of the container. The water inlet pipes are connected with supply mains 25, one between each pair of piers 12, and each inlet pipe is provided with an independent valve 26. The outlet pipes are preferably also connected in pairs and lead back to the reservoir or to such other point as may be desired.

In lieu of arranging the inlet pipes in pairs as described, they may all be supplied from a single main 27, as illustrated at the left hand end of Fig. 2.

In practice the water is supplied to the inlet pipes 22 by suitable pumps, or other impelling means, not shown, and is discharged into each of the containers through the perforations 24, filling the container 19, and flowing out of the pipe 23. By locating the inlet end of the pipe 23 close to the top of the container, the latter is kept substantially full of water at all times. By locating the containers as shown the piers are kept sufficiently cool to maintain their shape, and to prevent the corners being worn off or destroyed by the intense heat and attrition of the molten glass. The containers extend well below the bottom of the tank so that all of the connections are readily accessible should repairs or replacement be necessary.

Having thus explained the nature of my invention and described an operative manner of constructing and using the same, although without attempting to set forth all of the forms in which it may be made, or all of the forms of its use, what I claim is:—

1. The combination with a glass tank provided with open spaces leading to drawing chambers, of piers located at the inner corners of said spaces, and means for supplying a cooling liquid to the interiors of said piers to maintain them below the temperature at which they will be disintegrated by the molten glass.

2. The combination with a glass tank provided with open spaces leading to drawing chambers, of piers located at the inner corners of said spaces, each pier having a vertically disposed longitudinal bore, closed containers provided with straight tubular bodies extending through and filling said bores, said containers being closed at their ends, and means for supplying a cooling liquid to said containers.

3. The combination with a vertically disposed clay pier of a glass tank, of a straight tubular container extending longitudinally through said pier, the lower end of the container extending through the bottom of the tank, the upper end being exposed at the top of the pier, both ends being closed, and means for providing a circulation of a cooling liquid within said container.

4. The combination with a vertically disposed clay pier of a glass tank, of a straight tubular container extending longitudinally through said pier, the lower end of the container extending through the bottom of the tank, the upper end being exposed at the top of the pier, means for providing a circulation of a cooling liquid within said container, and removable caps closing the ends of said casing.

5. The combination with a vertically disposed clay pier of a glass tank, said pier having a longitudinal bore extending entirely therethrough, of a straight tubular container extending through and filling said bore, the lower end of the container extending through the bottom of the tank below said pier, the upper end being exposed at the top of the pier both ends being closed, and means for providing a circulation of a cooling liquid within said container.

6. The combination with a vertically disposed clay pier of a glass tank, said pier having a longitudinal bore extending entirely therethrough, of a straight tubular container extending through and below said bore, the lower end of the container projecting from the lower end of the bore through the bottom of the tank, the upper end being exposed at the top of the pier, caps removably closing the ends of said container, a water inlet pipe extending through the lower end of the cap into the container, and a water outlet pipe leading from the interior of the container near the top thereof and extending through said lower cap.

In testimony whereof I have hereunto set my hand in presence of two subscribing witnesses.

WALTER A. JONES.

Witnesses:
JOSEPH L. KEENER,
HARRY T. RANKIN.